US008557107B2

(12) United States Patent
Richard

(10) Patent No.: US 8,557,107 B2
(45) Date of Patent: Oct. 15, 2013

(54) SEWAGE TREATMENT SYSTEM

(76) Inventor: Chi-Hsueh Richard, San Jose, CA (US)

( * ) Notice: Subject to any disclaimer, the term of this patent is extended or adjusted under 35 U.S.C. 154(b) by 399 days.

(21) Appl. No.: 13/046,929

(22) Filed: Mar. 14, 2011

(65) Prior Publication Data

US 2011/0226683 A1  Sep. 22, 2011

Related U.S. Application Data

(60) Provisional application No. 61/340,452, filed on Mar. 17, 2010.

(51) Int. Cl.
*C02F 9/04* (2006.01)
*B01D 21/30* (2006.01)
*B01D 21/26* (2006.01)

(52) U.S. Cl.
USPC ........... 210/141; 210/202; 210/205; 210/206; 210/208; 210/209; 210/259; 210/380.1

(58) Field of Classification Search
USPC ......... 210/141, 202, 205, 206, 208, 209, 259, 210/381
See application file for complete search history.

(56) References Cited

U.S. PATENT DOCUMENTS

| 5,069,784 A * | 12/1991 | Taniguchi et al. ............ 210/205 |
| 5,705,069 A * | 1/1998 | Nagaoka ....................... 210/381 |
| 2010/0264075 A1* | 10/2010 | Korzeniowski ............... 210/205 |

* cited by examiner

*Primary Examiner* — David A Reifsnyder
(74) *Attorney, Agent, or Firm* — Rosenberg, Klein & Lee

(57) ABSTRACT

A sewage treatment system is revealed. Water with contaminants is drawn from sources to the sewage treatment system for automatic and fast water purification. Thus clean drinking water is generated. The water with contaminants is sent to a treatment tank by a motor. Then non-toxic and odorless chemicals are sprayed in the treatment tank. By stirring and mixing of movable blades, the contaminants are coagulated and precipitated into a funnel under the treatment tank to be discharged. Next clean water in the treatment tank is sent to a centrifuge separator to be filtered and dehydrated by centrifugation. Water comes out from the centrifuge separator is drinking water. The sewage is converted into clean water. The system can provide clean safe drinking water to regions without water treatment plants.

14 Claims, 4 Drawing Sheets

SEWAGE TREATMENT SYSTEM

This invention is filed by claiming a priority from an U.S. provisional application with a Ser. No. 61/340,452, filed on 17 Mar. 2010.

BACKGROUND OF THE INVENTION

1. Field of the Invention

The present invention relates to a sewage treatment system, especially to a sewage treatment system that converts water with contaminants into clean drinking water by automatic and fast water purification. Thus a clean drinking water supply is available.

2. Description of Related Art

Water sources such as rivers, lakes, streams, etc. are mainly used for tourism and irrigation. As to groundwater, it contains contaminants so that most is used for washing. Water from various water sources is sent to the households for individuals and families after being treated by a plurality of processes such as filtering, disinfection, and decontamination in water treatment plants.

However, the drinking water obtained by the above way is only available on regions or countries with water treatment plants. In remote areas or less developed countries without sufficient water supply, people still lack access to clean drinking water and this leads to infectious diseases and appalling sanitary conditions. The health and sanitation problems are increased.

SUMMARY OF THE INVENTION

Therefore it is a primary object of the present invention to provide a sewage treatment system that converts sewage into clean water automatically.

In order to achieve the above object, a sewage treatment system of the present invention mainly includes a treatment tank, a stirring apparatus, a spray part and a centrifuge separator. The stirring apparatus is set in the treatment tank and the spray part on top of the treatment tank scatters chemicals for disinfection, sterilization, bleaching, deodorization, and absorption of contaminants into the treatment tank and the chemicals is mixed with the sewage well by the stirring apparatus so as to absorb contaminants. Then the coagulated contaminants are precipitated into a funnel under the treatment tank to be removed through a drain pipe under the treatment tank. The treatment tank is connected to the centrifuge separator so that water purified in the treatment tank is centrifuged and filtered to get clean drinking water.

The stirring apparatus further consists of a first power motor that provides power to rotate a shaft with blades. The shaft is composed of a main tube with a telescopic tube therein, a telescopic rod mounted in the telescopic tube and arranged with at least one set of blades, a rope connected to a top end of the telescopic rod, and a fourth power motor. The rope is driven by the fourth power motor to make both the telescopic rod and the telescopic tube extend and move vertically within the main tube. Thus the blades rotate and stir the sewage.

The spray part includes a second power motor providing power to convey chemicals, a first chamber filled with colorless, odorless, and non-toxic chemicals that promote coagulation and flocculation and a second chamber that is filled with chemicals for disinfection, sterilization, bleaching, deodorization as well as a little amount of coagulants. All the chemicals are added into the treatment tank by a pipe with small holes therearound located in an upper part of the treatment tank.

The centrifuge separator is formed by an inner drum and an outer drum. The inner drum arranged with filter cloth is driven by a third power motor to centrifuge and filter the water purified. Then the filtered water is conveyed through an outlet pipe and drawn by a seventh power motor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
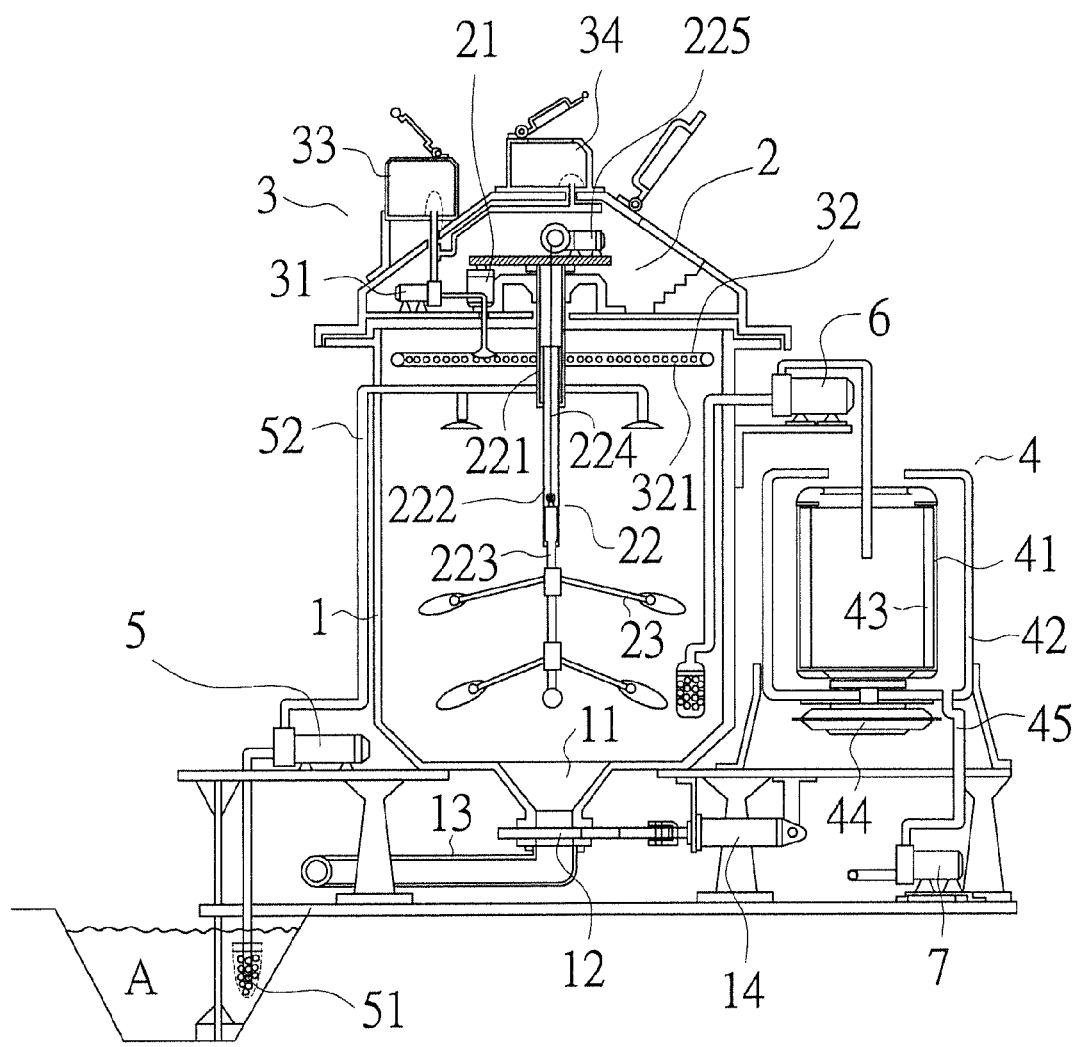
FIG. 1 is a schematic drawing showing structure of an embodiment according to the present invention.

Refer to FIG. 1, a sewage treatment system of the present invention mainly includes a treatment tank 1, a stirring apparatus 2, a spray part 3, a centrifuge separator 4, a filter 51 and a plurality of motors.

The treatment tank 1 that is a tank for receiving sewage input consists of a funnel 11 disposed in the treatment tank 1 on the bottom side, a valve 12 disposed on an outlet of the funnel 11 and a drain pipe 13 connected to valve 12 correspondingly.

The stirring apparatus 2 mounted in the treatment tank 1 includes a first power motor 21 that drives a shaft 22 with blades 23. The shaft 22 is formed by a main tube 221 with a telescopic tube 222 therein, a telescopic rod 223 assembled in the telescopic tube 222 and arranged with at least one set of blades 23, a rope 224 connected to a top end of the telescopic rod 223, and a fourth power motor 225. The rope 224 is driven by the fourth power motor 225 to make both the telescopic rod 223 and the telescopic tube 222 extend and move vertically within the main tube 221. Thus the blades 23 rotate and stir the sewage.

The spray part 3 is disposed with a second power motor 31 for transmission of chemicals through a pipe 32 with small holes 321 therearound. The pipe 32 is located in an upper part of the treatment tank 1.

The centrifuge separator 4 is connected to the treatment tank 1 for receiving water from the treatment tank 1 in which impurities have been removed. The centrifuge separator 4 includes an inner drum 41 arranged with filter cloth 43 and an outer drum 42 connected to an outlet pipe 45. The inner drum 41 is driven to rotate by a third power motor 44 under the inner drum 41 so that the water is moved to the outer drum 42 by centrifugal filtration. The outlet pipe 45 pipe conveys the purified water.

Refer from FIG. 1 to FIG. 4, in the sewage treatment system of the present invention, sewage A containing impurities from rivers, lakes, streams or underground water is carried out through the filter 51 on one end of a pipeline, a water pipe 52, and into the treatment tank 1 by a fifth power motor 5. The fifth power motor 5 is connected to the pipeline whose one end is with the filter 51. Thus a large amount of water with contaminants can be purified into clean and drinking water fast and automatically by the present system.

Figure 2:
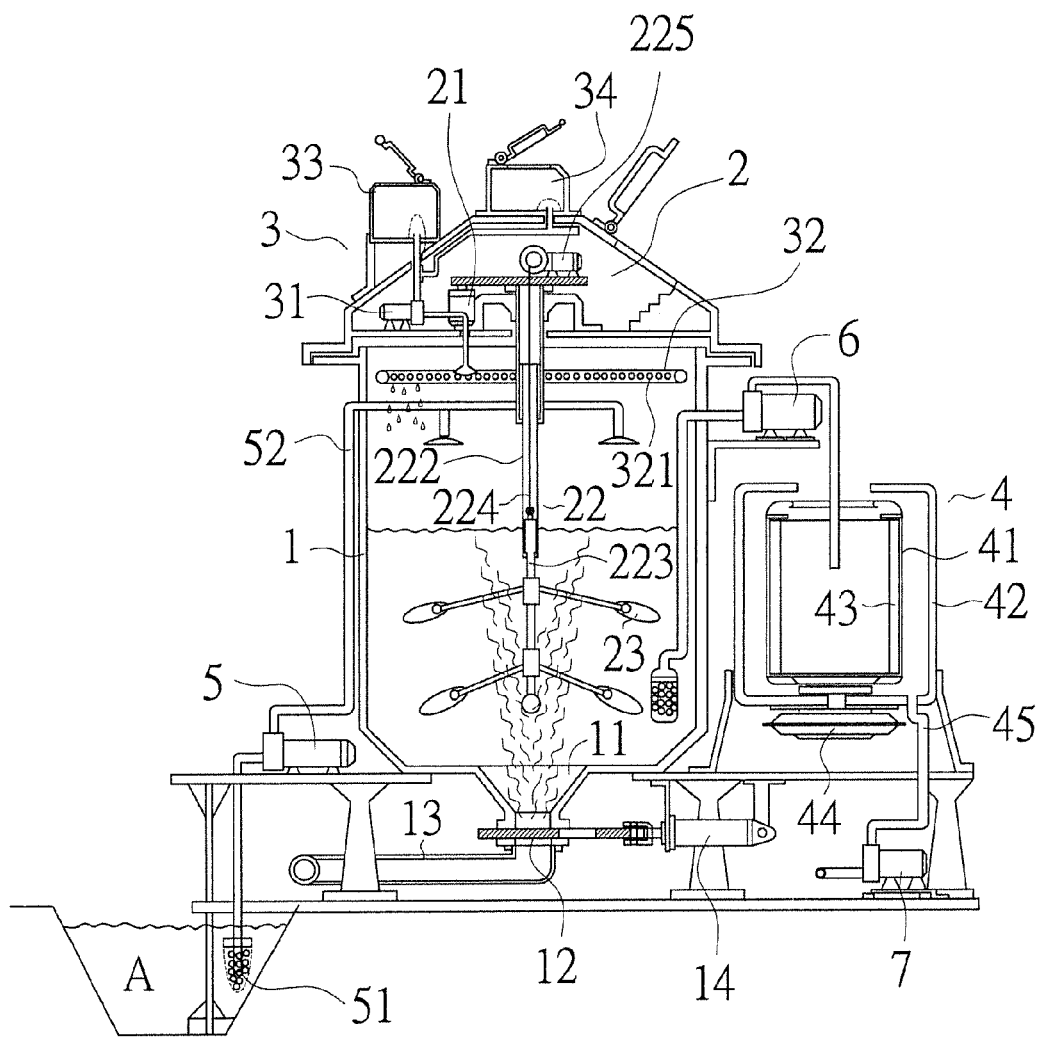
FIG. 2 is a schematic drawing showing an operating condition of an embodiment according to the present invention.

In use, the sewage A with contaminants is carried out into the treatment tank 1 by the fifth power motor 5. Then a first chamber 33 of the spray part 3 is set with colorless, odorless, and non-toxic chemicals that promote coagulation and flocculation while a second chamber 34 of the spray part 3 is filled with chemicals for disinfection, sterilization, bleaching, deodorization as well as a little amount of coagulants. Refer to FIG. 2, by the second power motor 31 of the spray part 3, the colorless, odorless, and non-toxic chemicals that promote coagulation and flocculation in the first chamber 33 is sent and sprayed through the small holes 321 around the pipe 32 to react with the sewage A in the treatment tank 1. At this moment, the shaft 22 with blades 23 of the stirring apparatus 2 in the treatment tank 1 is rotated by the first power motor 21. The rope 224 on top of the telescopic rod 223 is moved by the fourth power motor 225 to make both the telescopic rod 223 and the telescopic tube 222 extend and move within the main tube 221. Thus the blades 23 are moved vertically and rotated so as to mix the sewage A with the colorless, odorless, and non-toxic chemicals that promote coagulation and flocculation well. By adsorption and precipitation of the chemicals together with a vortex created by stirring, the contaminants are gathered on the funnel 11 on the bottom of the treatment tank 1. Now a computer control system (not shown in the figure) automatically stops the first power motor 21 and the fourth power motor 225 and thus the blades 23 stop rotating. The valve 12 on the outlet of the drain pipe 13 under the treatment tank 1 is opened automatically and periodically by a power cylinder 14. The contaminants on the funnel 11 on the bottom of the treatment tank 1 come out through the drain pipe 13. After completing disposal of the contaminants, the valve 12 is automatically closed by the power cylinder 14.

Figure 3:
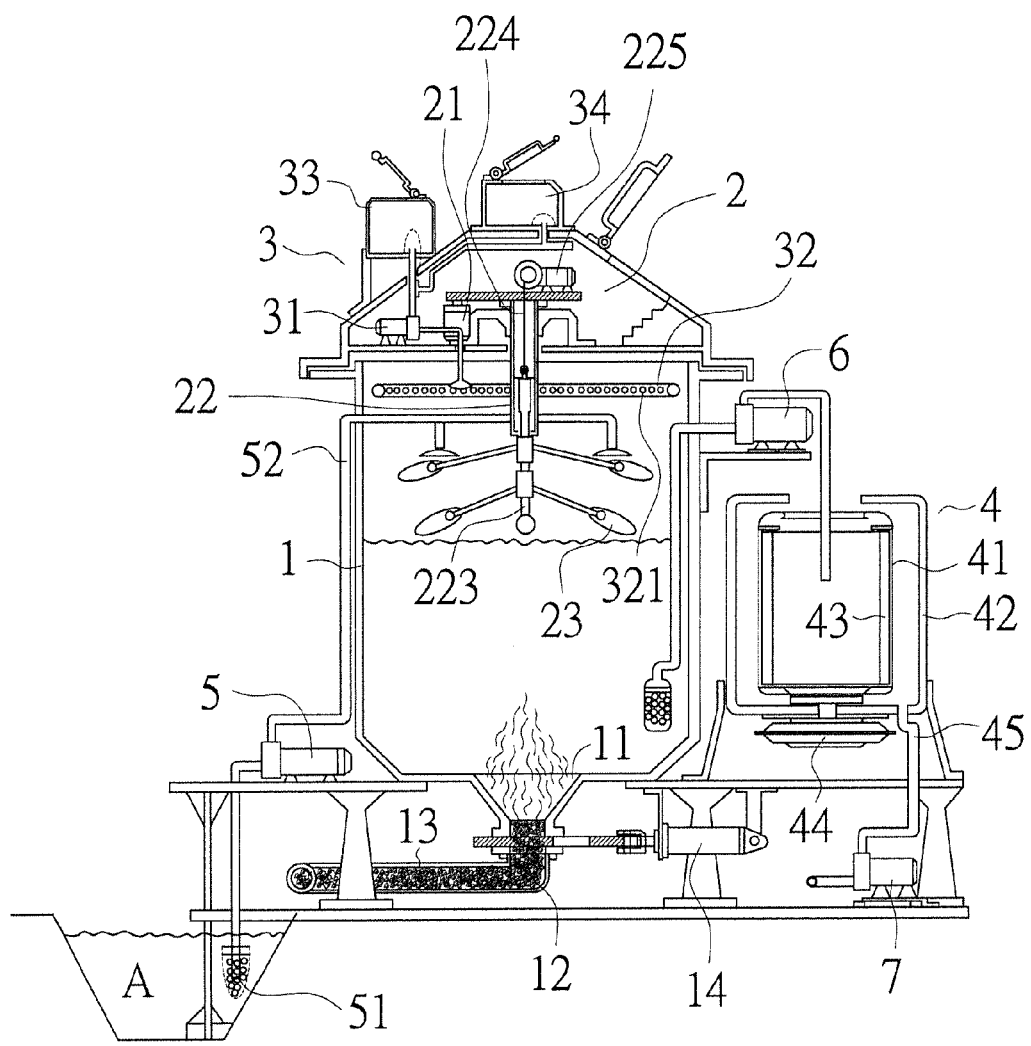
FIG. 3 is a schematic drawing showing another operating condition of an embodiment according to the present invention.

The water processed through all of the above steps is left in the treatment tank 1, as shown in the FIG. 3. Next these steps are taken again while the chemicals added this time are the chemicals for disinfection, sterilization, bleaching, and deodorization as well as a little amount of coagulants in the second chamber 34 sprayed by spray part 3. Then the stirring apparatus 2 works again and a vortex is creased so as to mix residual contaminants in the processed water with various chemicals. Thus the contaminants are coagulated and precipitated to the funnel 11 under the treatment tank 1 and then drained. The water left in the treatment tank 1 now is clean.

Figure 4:
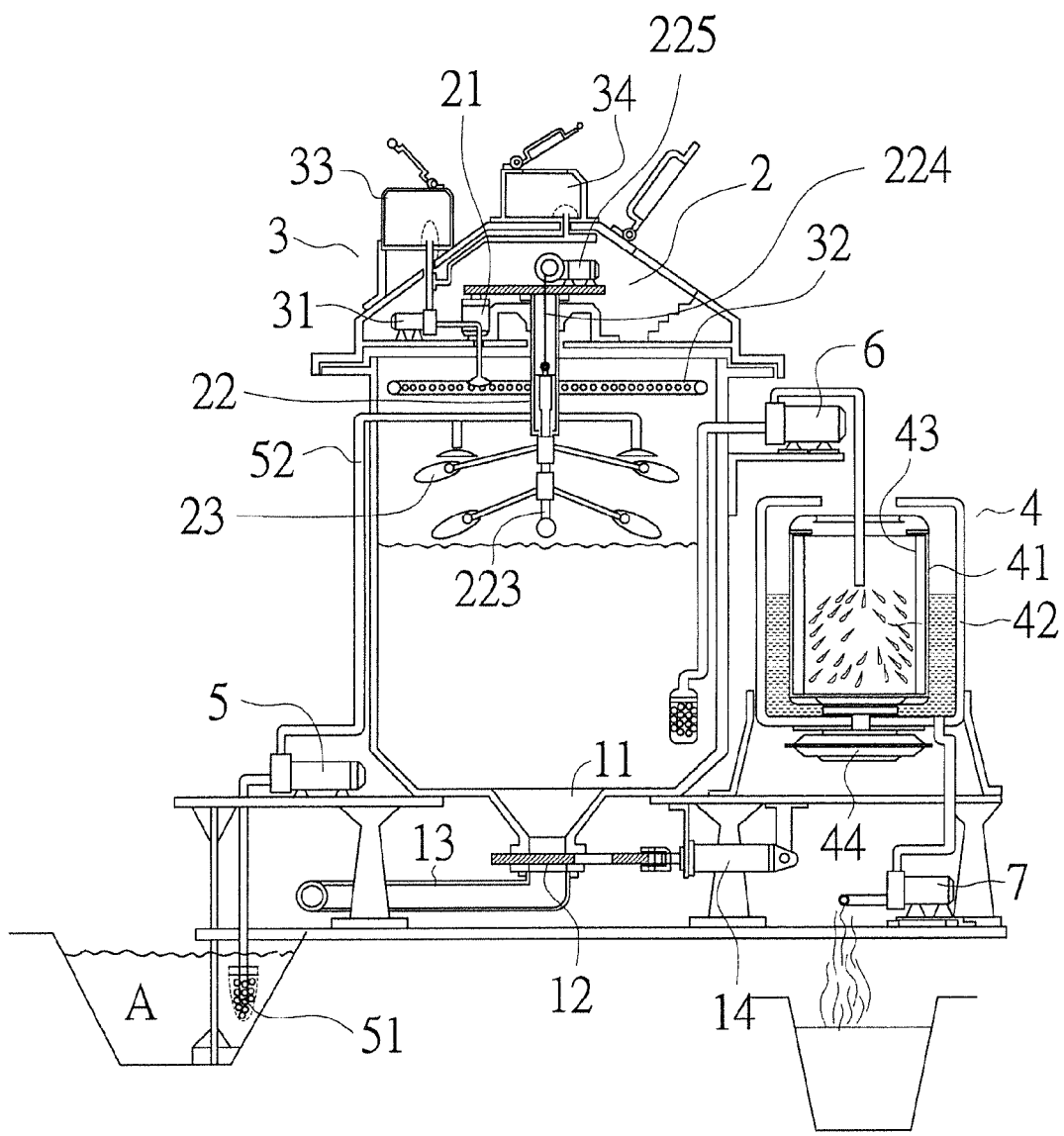
FIG. 4 is a schematic drawing showing a further operating condition of an embodiment according to the present invention.

At last, as shown in FIG. 4, a sixth power motor 6 is turned on automatically by the computer control system to draw the clean water from the treatment tank 1 into the inner drum 41. By the ultra-high speed rotation and the filter cloth 43 of the inner drum 41, the clean water is centrifuged and filtered by the centrifuge separator 4. The water out is clean and drinkable, conveyed through the outlet pipe 45 to large standpipes or darns as options by a seventh power motor 7 for urban water supply.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A sewage treatment system comprising:
   a treatment tank that is a tank for receiving sewage, having a funnel disposed in the treatment tank on the bottom side thereof, a valve disposed on an outlet of the funnel and a drain pipe connected to the valve correspondingly;
   a stirring apparatus mounted in the treatment tank and including a first power motor that drives a shaft with blades while the shaft is extendable so that the blades rotate and stir the sewage;
   a spray part that is disposed with a second power motor for transmission of chemicals through a pipe having small holes therearound and the pipe located in an upper part of the treatment tank; and
   a centrifuge separator that is connected to the treatment tank for receiving water from the treatment tank in which contaminants in the sewage have been removed; the centrifuge separator having an inner drum arranged with filter cloth and an outer drum connected to an outlet pipe; the inner drum is driven to rotate by a third power motor thereunder so as to filter the water by centrifugation and the water is moved to the outer drum; the outlet pipe conveys the purified water.

2. The system as claimed in claim 1, wherein the shaft includes a main tube with a telescopic tube therein, a telescopic rod assembled in the telescopic tube and at least one set of blades arranged around the telescopic rod, a rope connected to a top end of the telescopic rod, and a fourth power motor used for driving the rope; the rope is moved by the fourth power motor to make both the telescopic rod and the telescopic tube extend and move in the main tube; the blades are further rotated and stirred.

3. The system as claimed in claim 2, wherein the second power motor of the spray part is connected to a first chamber and a second chamber respectively while the first chamber and the second chamber respectively are filled with different chemicals.

4. The system as claimed in claim 3, wherein the sewage treatment system further includes a filter soaked in sewage; the filter is connected to a fifth power motor by a pipeline so as to draw sewage passing through a water pipe and flowing into the treatment tank when the fifth power motor is turned on.

5. The system as claimed in claim 4, wherein the valve on the outlet of the funnel is moved by a power cylinder.

6. The system as claimed in claim 5, wherein the sewage treatment system further includes a sixth power motor that pumps water from the treatment tank to the centrifuge separator.

7. The system as claimed in claim 6, wherein a seventh power motor that pumps water is arranged at the outlet pipe of the centrifuge separator.

8. The system as claimed in claim 7, wherein the sewage treatment system is controlled automatically by a computer control system.

9. The system as claimed in claim 1, wherein the second power motor of the spray part is connected to a first chamber and a second chamber respectively while the first chamber and the second chamber respectively are filled with different chemicals.

10. The system as claimed in claim 1, wherein the sewage treatment system further includes a filter soaked in sewage; the filter is connected to a fifth power motor by a pipeline so as to draw sewage passing through a water pipe and flowing into the treatment tank when the fifth power motor is turned on.

11. The system as claimed in claim 1, wherein the valve on the outlet of the funnel is moved by a power cylinder.

12. The system as claimed in claim 1, wherein the sewage treatment system further includes a sixth power motor that pumps water from the treatment tank to the centrifuge separator.

13. The system as claimed in claim 1, wherein a seventh power motor that pumps water is arranged at the outlet pipe of the centrifuge separator.

14. The system as claimed in claim 1, wherein the sewage treatment system is controlled automatically by a computer control system.

\* \* \* \* \*